United States Patent [19]

Hoffman et al.

[11] Patent Number: 4,796,870
[45] Date of Patent: Jan. 10, 1989

[54] SUSPENSION SYSTEM FOR VEHICLES CONTAINING COMBINATION ISOLATOR MOUNT AND AIR SPRING CLOSURE

[75] Inventors: Keith E. Hoffman, Atlanta; Wayne H. Geno, Cicero, both of Ind.

[73] Assignee: The Firestone Tire & Rubber Company, Akron, Ohio

[21] Appl. No.: 50,812

[22] Filed: May 18, 1987

[51] Int. Cl.⁴ .................. B60G 11/62; F16F 9/04; F16J 15/50; B25G 3/34
[52] U.S. Cl. ................................. 267/35; 74/18.2; 267/64.21; 267/64.24; 403/51; 403/267
[58] Field of Search ............ 267/35, 64.11, 64.19, 267/64.21, 64.23, 64.24, 64.26, 64.27, 122, 217, 219, 220; 280/672, 668, 711; 74/18, 18.1, 18.2; 92/34, 36, 44, 45, 168; 403/50, 51, 265, 267

[56] References Cited

U.S. PATENT DOCUMENTS

| | | | |
|---|---|---|---|
| 3,046,000 | 7/1962 | Polhemus et al. | 267/64.24 |
| 3,372,919 | 3/1968 | Jackson | 267/64.16 |
| 3,954,255 | 5/1976 | Keijzer et al. | 280/668 X |
| 4,492,366 | 1/1985 | Ozawa et al. | 267/35 X |
| 4,555,096 | 11/1985 | Pryor | 267/64.21 X |
| 4,592,540 | 6/1986 | Yokoya et al. | 267/35 X |
| 4,688,774 | 8/1987 | Warmuth | 280/712 X |

FOREIGN PATENT DOCUMENTS

| | | | |
|---|---|---|---|
| 1152316 | 8/1963 | Fed. Rep. of Germany | 267/64.24 |
| 60-241538 | 11/1985 | Japan . | |
| 846244 | 8/1960 | United Kingdom . | |

Primary Examiner—Andres Kashnikow
Assistant Examiner—Robert J. Oberleitner
Attorney, Agent, or Firm—Ronald Brietkrenz

[57] ABSTRACT

A suspension system for a vehicle having a shock absorber strut with a reciprocal rod located within a cylinder and an air spring having a fluid pressure chamber wherein the piston rod and cylinder extend through the chamber. The air spring includes a rigid annular canister and a flexible sleeve, one end of which is sealingly connected to the cylinder and the other end connected to the open bottom of the canister. An elastomeric isolator is bonded to a lower side of an end cap which is adapted to be secured to the vehicle. The isolator also is bound to and encloses the open upper end of the canister to close the pressure chamber of the air spring and to resiliently mount the air spring to the vehicle. An opening is formed in the isolator for sealingly receiving the upper end of the piston rod therethrough. The bonding of the end cap to the air spring canister by the isolator provides the fluid seal for the piston rod and dual path isolation for the suspension unit with a reduced number of parts.

20 Claims, 2 Drawing Sheets

SUSPENSION SYSTEM FOR VEHICLES CONTAINING COMBINATION ISOLATOR MOUNT AND AIR SPRING CLOSURE

TECHNICAL FIELD

The invention relates generally to vehicle suspension systems and in particular to an improved vehicle suspension system including an air spring in combination with a strut-type fluid shock absorber, and more particularly to such a suspension system which includes a combination elastomeric isolator and air spring closure unit for mounting the upper end of the vehicle suspension system on the vehicle.

BACKGROUND ART

Pneumatic devices commonly referred to as air springs, have been used with motor vehicles for a number of years to provide cushioning between movable parts of the vehicle suspension, primarily to absorb shock loads impressed on the vehicle axles by the wheels striking an object in the road or falling into a depression. These air springs usually consist of a flexible elastomeric sleeve or bellows containing a supply of compressed air or other fluid which is compressed or expanded as the vehicle experiences the road shock. The fluid is compressed and expanded within the spring sleeve since the sleeve is of a flexible material. The ends of the sleeve usually are sealingly connected to a top member or a lower piston member and have one or more rolled ends which permit the attachment or end members to move axially with respect to each other between a jounce or collapse position and a rebound or extended position without damaging the flexible sleeve.

It is desirable for many applications that a damping mechanism or device be used in combination with such air springs to provide damping for controlling the movement of the air spring. One type of vehicle damping or shock absorbing is achieved through a separate shock absorbing strut such as a McPherson strut, which uses a cylinder and a piston rod reciprocally mounted in the cylinder in combination with the air spring. The bottom of the cylinder is connected by an attachment bracket to one part of the vehicle and the piston rod or upper portion of the suspension system is attached to a separate spaced part of the vehicle for absorbing the road shocks exerted on the vehicle axles. In such suspension systems which use a strut-type fluid shock absorber it is desirable that the strut shaft or piston rod be isolated, usually in an elastomer, form the vehicle chassis and when used with an air spring to isolate it from the air canister which preferably is isolated in an elastomer from the vehicle chassis.

Some examples of vehicle suspension systems using strut-type fluid shock absorbers and isolator mounts without an air spring are shown in U.S. Pat. Nos. 4,248,454, 4,319,768, 4,478,396, 4,434,977, 4,256,292, 4,274,655, 4,289,193 and 4,531,759.

Other examples of prior art suspension systems which use a strut-type fluid shock absorber in combination with an air spring and an isolator mount for the shock absorber are shown in the following patents.

U.S. Pat. No. 3,046,000 shows a suspension system in which the top end of the piston rod is encapsulated in a rubber element bonded within a cylindrical cup which is attached to a separate spring assembly, cup the lower end of which has the bellows sleeve of a flexible diaphragm connected thereto.

U.S. Pat. No. 3,373,919 shows a vehicle strut having a flexible sleeve extending between a dust shield and a piston cylinder for containing a pressurized fluid so that the air spring unit will be maintained between predetermined pressure levels.

U.S. Pat. No. 4,555,096 discloses a suspension system in which the top of the piston rod is attached to the vehicle chassis through an elastomeric isolator in combination with a flexible sleeve which forms an air spring in combination with a rigid upper cup shaped member which compresses the isolator or rubber mount between the top wall of the canister and the mounting bracket for the piston rod. One of the main problems with suspension units such as shown in this patent is the ability to provide satisfactory air seals for the air sleeve at its junction with the piston rod and/or cylinder and isolator mount.

U.S. Pat. No. 4,592,540 shows another suspension unit having an air sleeve extending between the bottom of a cylindrical upper member or housing which forms the pressurized fluid chamber, and a separate isolator mount which connects the piston rod to the vehicle chassis. Again, such a suspension system requires multiple parts which must be manufactured and assembled thereby increasing the cost of the unit, and it requires complicated air seals for the pressure chamber of the air spring.

Japanese Pat. No. 60-241538 shows another combination air spring and strut-type fluid shock absorber in which the piston rod is connected through an isolator mount to the vehicle chassis. United Kingdom Pat. No. 846,244 shows still another type of suspension unit combining an air spring with a fluid shock absorber.

Although many of these prior art suspension systems perform satisfactorily for their intended function, these as well as other known suspension units, require that the upper isolator mount for the air spring and strut-type fluid shock absorber requires a number of separate components which increases the cost of the final unit and the assembling thereof. Also, the cost of mounting such a multiple component unit on a vehicle in an assembly line is increased, and since many of these suspension units require complicated air seals they periodically must be replaced and repaired after a period of use on a vehicle.

Therefore, the need exists for a suspension system using a strut-type fluid shock absorber in combination with an air spring and an isolator mount for mounting the system onto a vehicle chassis, in which the suspension system has a reduced number of parts without the loss of efficiency and desirable results achieved by the suspension system.

DISCLOSURE OF THE INVENTION

Objectives of the invention include providing an improved suspension system for vehicles which contains a combination isolator mount and air spring closure, which reduces the number of parts heretofore required to enclose the air spring component of the system and to mount the suspension system on a vehicle while providing isolation therefor; and in which the reduction in the number of parts will reduce the assembly cost both of the system itself and the mounting of the system on a vehicle in an assembly line.

Another objective of the invention is to provide such a suspension system which uses a usual shock absorber strut in combination with an air spring of the type having a flexible sleeve or diaphragm which is mounted at a lower end to the cylinder of the shock absorber strut and at an upper end to a rigid annular canister component of the air spring, and in which the canister together with the flexible sleeve forms a pressurized fluid chamber; and in which the top portion of the fluid chamber provided by the canister is sealed with the isolator material which also mount the canister to an end plate which in turn is secured by fasteners to a vehicle chassis.

A further objective of the invention is to provide such an improved suspension system in which the piston rod of the shock absorber strut and upper end of the cylinder extend through the pressurized fluid chamber of the air spring with the piston rod extending in a fluid-tight relationship through a passage formed in the isolator material; and in which the isolator material is compressed against the piston rod to form the desired fluid-tight seal by trapping and compressing a cylindrical portion of the isolator material between a pair of clamping plates or stops by a single nut mounted on the threaded end of the piston rod.

A still further objective of the invention is to provide such an improved suspension system in which a compression bumper is mounted on the piston rod and located within the fluid chamber of the air spring and is compressed between the top of the piston and a bumper cup upon the system reaching a predetermined jounce or collapsed position to prevent damage to the suspension system; in which the isolator mount provides an efficient interface between the air spring and fluid shock absorber and may be formed of a single durometer rubber to reduce molding costs by providing a one piece molded construction eliminating the several rubber parts of different durometers heretofore required in prior isolator mounts; in which the isolator mount provides the fluid seal between the shock absorber piston rod with the exterior of the suspension unit and internal fluid pressure chamber; and in which the rigid canister portion of the air seal and mounting end cap of the suspension system are molded in a spaced relationship with respect to each other by the resilient material of the isolator mount, which one-piece unit then can be mounted easily on the fluid strut shock absorber and flexible sleeve component of the air spring in a simple and inexpensive manner.

Another objective of the invention is to provide such an improved suspension system which is of a relatively simple design, economical to manufacture and install on vehicles in an assembly line, and which increase the life and effective operation of the shock absorber strut and air spring features of the suspension system.

These objectives and advantages are obtained by the improved air spring suspension system of the invention, the general nature of which may be stated as including a fluid shock absorber strut having an outer cylinder and reciprocal piston rod; first attachment means for mounting the cylinder on a first vehicle support structure; a fluid pressure chamber formed by an annular canister and a flexible sleeve sealingly connected to and extending between said canister and the cylinder, said pressure chamber adapted to contain a supply of pressurized fluid, with said piston rod and cylinder extending through said pressure chamber; an isolator unit for mounting the canister on a second vehicle support structure spaced from the first vehicle support structure, said isolator unit comprising an end cap adapted to be secured to said second vehicle support structure and an isolator formed on an elastomeric material bonded to said end cap and to said canister which is spaced below said end cap, and said isolator being formed with an axially extending opening for passage of the piston rod therethrough in a generally fluid tight relationship.

BRIEF DESCRIPTION OF THE DRAWINGS

A preferred embodiment of the invention illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

BEST MODE FOR CARYING OUT THE INVENTION

Figures 1, 2:
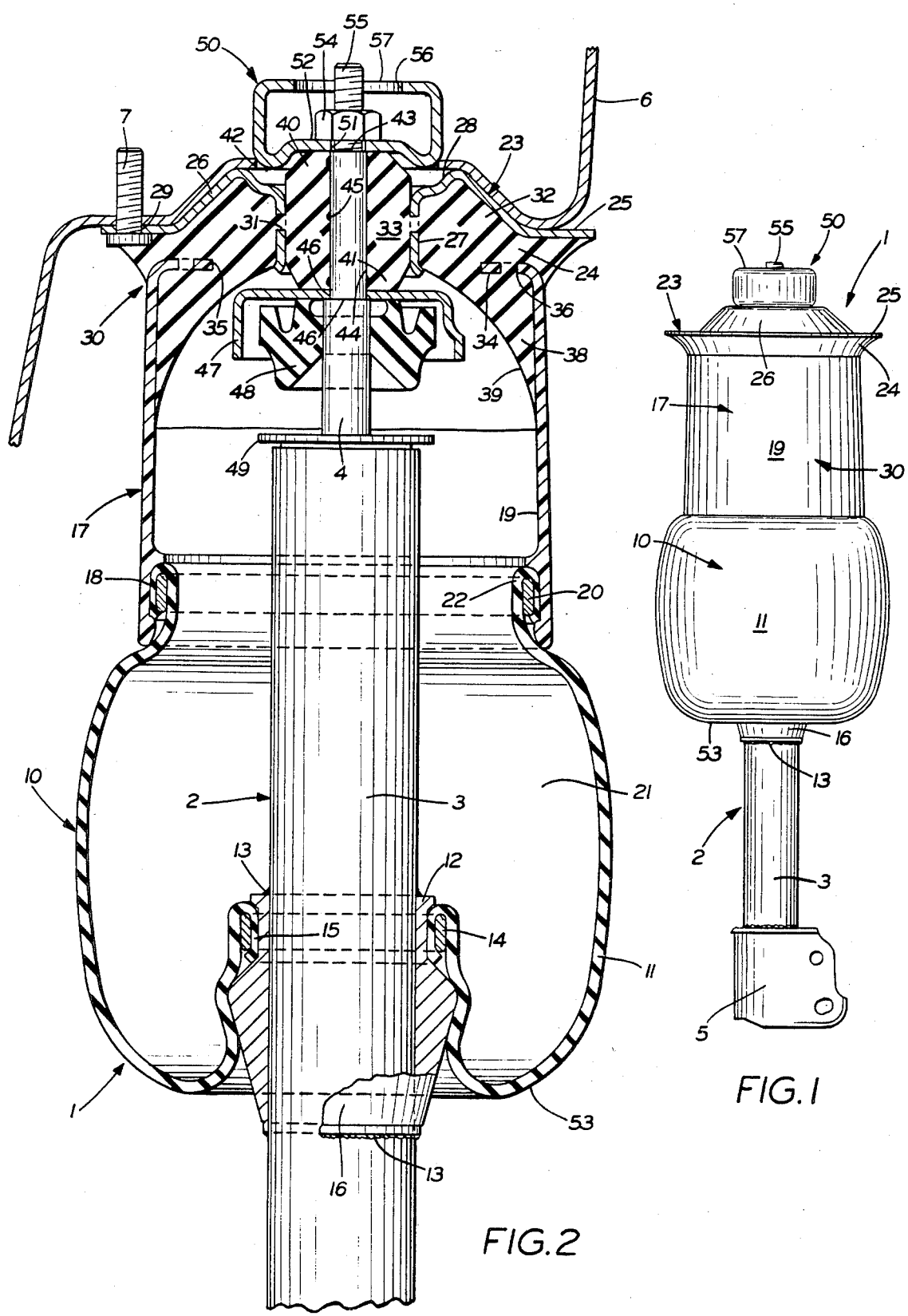
FIG. 1 is a perspective view showing the improved suspension of the invention containing the combination isolator mount and air spring closure.
FIG. 2 is an enlarged elevational view of the upper portion of the suspension system of FIG. 1 attached to the chassis of a vehicle.

The improved air spring suspension system of the invention is indicated generally at 1, and is shown in elevation in FIG. 1, with the main components thereof being shown principally in section in FIG. 2. Suspension system 1 includes a usual shock absorber strut indicated generally at 2, consisting of a cylinder 3 and a piston rod 4 reciprocally mounted therein having a piston (not shown) located within cylinder 3.

Cylinder 3 is operatively mounted within or upon a wheel spindle or stub axle (not shown) of a vehicle by an attachment bracket 5 the particular mounting arrangement of which is well known in the art. The upper end of the suspension unit is mounted on another portion of the vehicle chassis 6 by a plurality of mounting bolts 7 described in further detail below.

An air spring indicated generally at 10, consists of a flexible sleeve or diaphragm 11 preferably formed of an elastic material having internal reinforcing fabric (not shown). Sleeve 11 is sealingly attached at its lower end by an annular clamping band 14 to a ring 12 of a piston 16, the lower end of which is attached by welds 13 to cylinder 3. Band 14 crimps turned end 15 of sleeve 11 against ring 12 to form a fluid-tight seal in a manner well known in the art.

Air spring 10 further includes a cylindrical-shaped canister indicated generally at 17, preferably formed of a rigid plastic. Canister 17 has a lower internal annular groove 18 formed in a bottom open end of a cylindrical sidewall 19 in which an in-turned end 22 of sleeve 11 is clamped by an internal clamping band 20. The interior of canister 17 and sleeve 11 forms a fluid chamber 21 for containing a supply of a pressurized fluid, preferably air.

Figure 5:
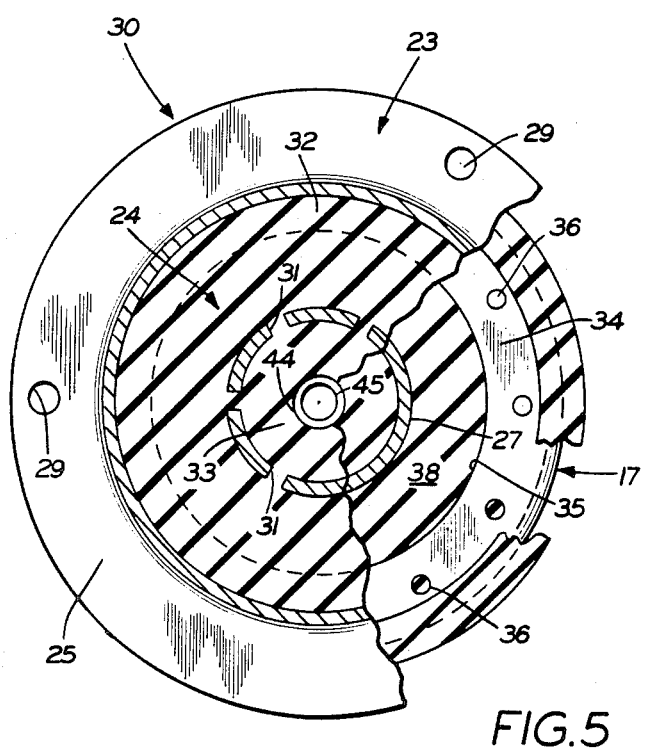
FIG. 5 is a sectional view with additional portions broken away, taken on line 5—5 FIG. 3.

In accordance with one of the main features of the invention, canister 17 is bonded to a end cap indicated generally at 23, by an isolator indicated generally at 24, which provides the isolator mount for the suspension system in addition to enclosing the upper open end of the air spring. End cap 23 preferably is formed of rigid metal and has an annular configuration with an outer generally planner annular end flange 25 and an intermediate conical portion 26 which is connected to an axially extending cylindrical inner flange 27 by a curved annular connecting portion 28. End cap 23 is mounted on vehicle chassis 6 by a plurality of bolts 7, only one of which is shown in the drawings, which extend through holes 29 formed in outer annular flange 25 (FIGS. 2 and 5).

Figure 3:
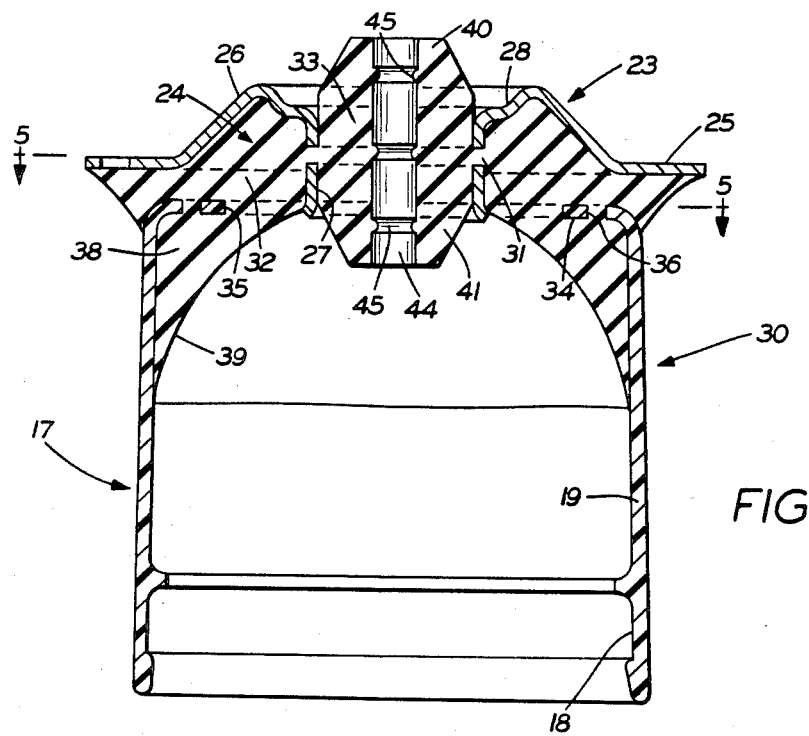
FIG. 3 is a sectional view of the one piece combination elastomeric isolator and air spring closure unit of the invention removed from its attachment with a usual strut-type shock absorber as shown in FIG. 2.

Isolator 24 preferably is formed of a single durometer elastomeric material and bonds end cap 23 to canister 17 to form a one piece elastomeric isolator and air spring closure unit indicated generally at 30, as shown in FIG. 3.

Cylindrical inner flange 27 of end cap 23 is formed with plurality of holes 31 through which the elastomeric material flows for integrally joining an intermediate annular portion 32 of isolator 24 with a central cylindrical sleeve portion 33 of isolator 24.

Canister 17 is formed with a top wall 34 having an enlarged central opening 35 surrounded by a plurality of smaller holes 36 through which the isolator material passes for integrally joining intermediate annular portion 32 of the isolator with a lower isolator portion 38. The elastomeric isolator material also flows through enlarged central opening 35 of canister top wall 34 when forming lower isolator portion 38 which preferably is provided with a concave bottom surface 39 located beneath top wall 34 within the interior of canister 17 to provide a dome-shaped closure wall for the fluid pressure chamber. As shown in FIG. 2, cylindrical inner flange 27 of end cap 23 extends generally into and terminates generally at the same plane as that of top wall 34 and central opening 35 of canister 17.

Central cylindrical sleeve portion 33 of isolator 24 has a pair of generally tapered top and bottom end portions 40 and 41 which extend above and beyond the confines of cylindrical inner flange 27 whereby top end 40 also extends through central opening 42 formed in end cap 23. Central cylindrical sleeve portion 33 of isolator 24 is formed with a hollow bore 44 and has a series of annular ribs 45 extending into the bore. Ribs 45 are compressed against the top portion of piston rod 4 to provide a fluid-tight sealing engagement when piston rod 4 is inserted through hollow bore 44 upon mounting isolator closure unit 30 on the shock absorber strut as shown in FIG. 2.

Figure 4:
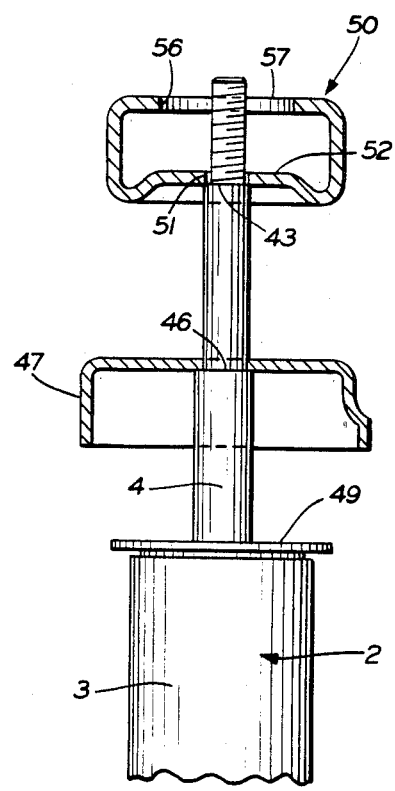
FIG. 4 is a fragmentary view showing the upper portion of the cylinder and piston rod of the fluid shock absorber with the pair of clamping stops being shown in section mounted thereon.

Referring to FIGS. 2 and 4, piston rod 4 is formed with upper and lower shoulders 43 and 46. An inverted cup-shaped bumper stop 47 is supported on lower shoulder 46 and a generally rectangularly-shaped rebound stop 50 is located on upper shoulder 43. A usual elastomeric bumper 48 is telescopically slidably mounted on piston rod 4 beneath bumper stop 47 to limit the movement of shock absorber strut 2 in the jounce or collapsed position whereby bumper 48 is compressed between stop 47 and a sealing washer 49 mounted on the upper end of cylinder 3. Rod 4 extends through aligned holes 51 and 56 formed in bottom and top walls 52 and 57, respectively, of stop 50. Stop 50 compresses central cylindrical portion 33 of isolator 24 against bumper stop 47 by advancing a nut 54 along a threaded upper end 55 of piston rod 4 until stop 50 abuts shoulder 43. Nut 54 is accessible through enlarged opening 56 of top wall 57.

In accordance with one of the features of the invention, isolator and enclosure unit 30 is formed as a one-piece member (FIG. 3) by bonding isolator 24 onto end cap 23 and canister 17 after which unit 30 is installed easily onto air spring sleeve 11 by clamping bands 14 and 20. Piston rod 4 is slidably inserted through hollow bore 44 of cylindrical central portion 33 with annular ribs 45 providing a fluid-tight sealing engagement with the piston rod. Adjustment of nut 54 on rod end 55 will compress cylindrical portion 33 between bumper stop 47 and rebound stop 50 securing piston rod 4 with respect to vehicle chassis 6. The improved suspension is firmly mounted on chassis 6 by a plurality of mounting bolts 7 which extend through holes 29 of end cap flange 25. Bumper 48 is installed on piston rod 4 beneath bumper stop 47 before inserting the rod through isolator 24.

The internal pressure of the fluid within chamber 21 with bellow, or expand, flexible sleeve 11 outwardly to the desired position and the fluid pressure within the chamber in combination with the resistance provided by shock absorbing strut 2, will absorb and dampen the shock forces exerted on the vehicle wheel. Upon the vehicle wheel encountering a depression in the roadway the suspension system will assume a rebound position in which cylinder 3 will move downwardly with respect to vehicle chassis 6 unrolling folds 53 of flexible sleeve 11. Upon the vehicle tire encountering a projection in the roadway cylinder 3 will move upwardly into a jounce position compressing the fluid in chamber 21 to absorb the road shocks. If an exceptionally large jounce force is exerted on the vehicle wheel sealing washer 49 of cylinder 3 will compress bumper 48 against bumper stop 47, which in turn will engage previously compressed cylindrical portion 33 of isolator 24.

The construction defined above and in particular isolator and air spring closure unit 30, enables a single durometer rubber to be used for forming isolator 24 which also assembles end cap 23 with canister 17. In addition unit 30 provides the isolator mount for the air sleeve and piston rod and provides the end closure for the air spring. This eliminates the heretofore required additional components of prior art air spring and shock absorber suspension systems. This one piece molded construction of unit 30 reduces both material costs and labor costs to the end user and eliminates separate air seals or sealing rings heretofore required in prior suspension system which were subject to failure and replacement.

Although a single durometer rubber is the preferred construction of isolator and air spring enclosure unit 30, a dual durometer rubber could be used to achieve other operating characteristics, if desired, without affecting the concept of the invention. The dome-shaped configuration provided by concave surface 39 of isolator 24 enables the end closure of canister 17 to be able to better withstand the internal fluid pressure within chamber 21. Also, upper stop 50 may be used as a bracket for mounting the motor of an electronic adjustable strut if desired. In the preferred embodiment, canister 17 is formed of a rigid plastic and end cap 3, bumper stop 47 and rebound stop 50 are formed of rigid stamped metal components.

Accordingly, the improved suspension system containing the combination isolator mount and air spring closure is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension system for vehicles containing a combination isolator mount and air spring closure is constructed and used, the characteristics of the construction, and the advantageous, new and useful results obtained; the new and useful structures, devices, elements, arrangements, parts, and combinations, are set forth in the appended claims.

What is claimed is:

1. An improved air spring suspension system for vehicles including:
   (a) a fluid shock absorber strut having an outer cylinder and a reciprocal piston rod;
   (b) first attachment means for mounting the cylinder on a first vehicle support structure;
   (c) a fluid pressure chamber formed by a canister and a flexible sleeve sealingly connected to and extending between said canister and the cylinder, said pressure chamber adapted to contain a supply of pressurized fluid with said piston rod and cylinder extending through said pressure chamber; and
   (d) an isolator unit for mounting the canister on a second vehicle support structure spaced from the first vehicle support structure and for closing an open tope of the canister, said isolator unit comprising an end cap adapted to be secured to said second vehicle support structure and an isolator formed of an elastomeric material bonded to said end cap and to said canister which is spaced below said end cap; said isolator being an integral one-piece member having generally concave bottom surface forming a generally dome-shaped end closure for the air spring, a central portion formed with an axially extending opening for passage of the piston rod therethrough and adapted to be placed in compression when the isolator unit is mounted on a vehicle, said isolator furthermore having an intervening portion located between a lower surface of the end cap and an upper surface of the canister for bonding the end cap to the canister.

2. The suspension system defined in claim 1 in which the flexible sleeve is connected to the cylinder by an annular clamping band.

3. The suspension system defined in claim 1 in which an elastomeric bumper is telescopically mounted about the piston rod and is engaged by a bumper cup mounted on the piston rod upon the piston rod reaching a predetermined reciprocated position within the cylinder.

4. The suspension system defined in claim 1 in which a clamping band sealingly connects an upper open end of the flexible sleeve to an inside surface of the canister.

5. The suspension system defined in claim 1 in which the canister has a cylindrical side wall and a top wall formed with a central opening which forms the open top of the canister; in which a plurality of smaller holes are formed in a spaced surrounding relationship with respect to said central opening in the top wall; and in which the isolator material extends through said central opening and holes when bonding the end cap to the canister.

6. The suspension system defined in claim 5 in which the end cap is an annular member having a cylindrical axially extending inner flange which defines a central passage which is concentric with the axially extending opening of the isolator and aligns with the central opening of the canister top wall.

7. The suspension system defined in claim 6 in which a plurality of radially extending holes are formed in the cylindrical flange of the end cap; and in which the isolator material extends through said radial holes when bonding the end cap to the canister.

8. The suspension system defined in claim 7 in which isolator material located within the cylindrical flange of the end cap forms an annular sleeve of elastomeric material integrally connected to the remaining portion of the isolator material through the radially extending holes; and in which said sleeve of elastomeric material has top and bottom ends which extend axially beyond the cylindrical flange.

9. The suspension system defined in claim 8 in which a bumper cup is mounted on the piston rod and is engaged with the bottom end of the annular elastomeric sleeve; and in which a stop is mounted on the piston rod in a spaced relationship from the bumper cup and is compressed against the top end of the said elastomeric sleeve, placing said sleeve in compression between the stop and bumper cup.

10. The suspension system defined in claim 8 in which the isolator is formed with an inner bore and a series of annular ribs extending into said bore, with said bore forming the axially extending opening of the isolator; and in which said ribs sealingly engage the piston rod in providing the generally fluid tight relationship between the piston rod and isolator.

11. the suspension system defined in claim 6 in which the end cap further includes an outer annular flange formed with a plurality of spaced holes; and in which the end cap is adapted to be secured to the vehicle by fasteners extending through said flange holes.

12. The suspension system defined in claim 1 in which the central portion of the isolator is generally cylindrically shaped; and in which the intervening portion is generally annularly shaped 13. A combination elastomeric isolator and air spring closure unit for an upper end of vehicle suspension system of the type having a fluid shock absorber strut having an outer cylinder and a reciprocal piston rod, and an air spring having a flexible sleeve for forming a fluid pressure chamber therein, in which said sleeve has upper and lower open ends with said lower end being sealingly connected to the outer cylinder of the strut; said unit including:
   (a) an end cap formed with a central opening for passage of the piston rod therethrough, said end cap being adapted to be secured to a vehicle;
   (b) a canister having top and bottom ends with openings formed therein; with the upper open end of the flexible sleeve being sealingly connected to the bottom end opening of said canister;
   (c) an elastomeric isolator bonded to the end cap an to the upper end of the canister to close the top end opening of said canister and to resiliently join the end cap and canister;

(d) opening means formed in the isolator for passage of the piston rod therethrough; and (e) said isolator being an integral one-piece member having a generally concave bottom surface which forms a generally dome-shaped end closure for the air spring canister, a central portion placed in compression when the isolator unit is mounted on a vehicle, and an intervening portion located between a lower surface of the end cap and upper surface of the canister for bonding the end cap to the canister.

14. The isolator and closure unit defined in claim 13 in which the canister has a cylindrical side wall and a top wall formed with a plurality of openings; and in which the isolator material extends through said openings to bond the canister to the end cap.

15. The isolator and closure unit defined in claim 13 in which the end cap is formed of a rigid metal and the canister is formed of plastic.

16. The isolator and closure unit defined in claim 13 in which a series of annular ribs are formed integrally on an inner bore of the central portion of the elastomeric isolator, which bore forms the opening means of the isolator for passage of the piston rod; and in which said ribs engage the piston rod in providing the generally fluid tight relationship between the piston rod and isolator.

17. The isolator and closure unit defined in claim 13 in which the end cap is an annular member having a cylindrical axially extending inner flange which defines a central passage which is concentric with opening means of the isolator and which aligns with the central opening of the canister top wall.

18. The isolator and closure unit defined in claim 17 in which the cylindrical inner flange extends generally into the top wall opening of the canister.

19. The isolator and closure unit defined in claim 13 in which the central portion of the isolator is generally cylindrically shaped; and in which the intervening portion is generally annularly shaped.

20. An improved air spring suspension system for vehicles including:

(a) a fluid shock absorber strut having an outer cylinder and a reciprocal piston rod;

(b) first attachment means for mounting the cylinder on a first vehicle support structure;

(c) a fluid pressure chamber formed partially by a flexible sleeve sealingly connected at one end to the cylinder, said pressure chamber adapted to contain supply of pressurized fluid with said piston rod and cylinder extending through said pressure chamber; and (d) a one-piece elastomeric isolator and air spring closure unit for mounting the suspension system on a second vehicle support structure spaced from the first vehicle support structure and for closing the pressure chamber; said unit being comprised of a rigid canister sealing connected to a second end of the flexible sleeve and forming a portion of the pressure chamber, and an end cap adapted to be secured to said second vehicle support structure, and an isolator formed of an elastomeric material and located generally between and bonded to said end cap and to said canister which is spaced below said end cap, said isolator being formed with an axially extending opening for passage of the piston rod therethrough, and said canister being formed with opening means for passage of the elastomeric isolator material therethrough and into the interior of said canister for bonding said canister to the isolator.

* * * * *